US012576818B2

(12) United States Patent
Sutton et al.

(10) Patent No.: US 12,576,818 B2
(45) Date of Patent: Mar. 17, 2026

(54) METHOD AND SYSTEM FOR ENHANCED BRAKING IN A TRACTOR UNIT

(71) Applicant: J. C. Bamford Excavators Limited, Uttoxeter (GB)

(72) Inventors: Thomas George Sutton, Uttoxeter (GB); Lawrence Lyndon Helmick, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 192 days.

(21) Appl. No.: 18/217,406

(22) Filed: Jun. 30, 2023

(65) Prior Publication Data

US 2024/0001894 A1     Jan. 4, 2024

(30) Foreign Application Priority Data

Jun. 30, 2022     (GB) ...................................... 2209659

(51) Int. Cl.
B60T 8/17          (2006.01)
B60K 31/00       (2006.01)
(Continued)

(52) U.S. Cl.
CPC ........ B60T 8/1708 (2013.01); B60K 31/0058 (2013.01); B60T 8/172 (2013.01);
(Continued)

(58) Field of Classification Search
CPC ...... B60T 8/1708; B60T 8/172; B60T 8/1755; B60T 2260/04; B60T 2270/88;
(Continued)

(56) References Cited

U.S. PATENT DOCUMENTS 2,569,610 A     10/1951   Ingres
5,433,296 A  *   7/1995   Webberley ............ F16D 66/025
                                                                73/121
(Continued)

FOREIGN PATENT DOCUMENTS

DE       102008014459 A1     9/2009
EP           0314067 A2     5/1989
(Continued)

OTHER PUBLICATIONS

Ahokas et al., Dynamic Behaviour of a Tractor-trailer Combination during Braking, 2003, Biosystems Engineering (2003) 85, pp. 29-39 (Year: 2003).*

(Continued)

*Primary Examiner* — Sze-Hon Kong
(74) *Attorney, Agent, or Firm* — MARSHALL, GERSTEIN & BORUN LLP

(57)          ABSTRACT

A method for controlling the braking effort of a tractor unit relative to the braking effort of a trailer being towed by the tractor unit comprises: activating an enhanced braking mode in the tractor unit; receiving a braking command from an operator input device whilst in the enhanced braking mode; increasing a tractor unit speed demand on the tractor unit whilst receiving the braking command; and applying the brakes to the trailer and tractor unit, wherein the braking effort applied to the tractor unit is reduced relative to the trailer due to the increased speed demand.

16 Claims, 13 Drawing Sheets

(51) Int. Cl.
   *B60T 8/172* (2006.01)
   *B60T 8/1755* (2006.01)
(52) U.S. Cl.
   CPC ......... *B60T 8/1755* (2013.01); *B60T 2260/04* (2013.01); *B60T 2270/88* (2013.01)
(58) Field of Classification Search
   CPC ...... B60T 7/20; B60T 2260/09; B60T 13/662; B60K 31/0058; F16H 59/44; F16H 59/14; F16H 2059/743; B60W 10/10; B60W 30/14
   See application file for complete search history.

(56) References Cited

U.S. PATENT DOCUMENTS

| | | | | |
|---|---|---|---|---|
| 11,447,108 | B1* | 9/2022 | Bailey | B60T 8/172 |
| 2008/0172163 | A1* | 7/2008 | Englert | B60T 8/1708 303/147 |
| 2012/0041659 | A1* | 2/2012 | Greene | B60D 1/30 701/70 |
| 2014/0343813 | A1 | 11/2014 | Morselli et al. | |
| 2016/0339883 | A1 | 11/2016 | Kim | |
| 2017/0197621 | A1* | 7/2017 | Foster | B60W 30/1888 |
| 2018/0093538 | A1* | 4/2018 | Rothschild | B60T 8/1708 |
| 2018/0112754 | A1* | 4/2018 | Buhrke | F16H 37/042 |
| 2018/0186348 | A1* | 7/2018 | Komatsu | B60T 7/22 |
| 2018/0223918 | A1* | 8/2018 | Bulgrien | F16H 61/684 |
| 2018/0290653 | A1* | 10/2018 | Staedele | F16H 47/04 |
| 2019/0084533 | A1* | 3/2019 | Kasper | B60T 13/683 |
| 2019/0299946 | A1* | 10/2019 | Miller, Jr. | B60T 8/38 |
| 2020/0278025 | A1* | 9/2020 | Bradley | F16H 61/66236 |
| 2021/0078553 | A1* | 3/2021 | Adeeb | B60T 8/4031 |
| 2021/0331653 | A1* | 10/2021 | Britsch | B60T 8/1708 |
| 2022/0135041 | A1* | 5/2022 | Heseding | B60R 16/0231 701/22 |
| 2022/0169218 | A1* | 6/2022 | Takasuga | B60T 8/1755 |
| 2022/0185246 | A1 | 6/2022 | Szuck et al. | |
| 2023/0020585 | A1* | 1/2023 | Flaum | B60L 3/102 |
| 2023/0054037 | A1* | 2/2023 | Switkes | G05D 1/244 |
| 2023/0286492 | A1* | 9/2023 | Frankovics | B60W 10/18 |
| 2023/0311873 | A1* | 10/2023 | Bolf | B60D 1/248 701/23 |
| 2024/0042976 | A1* | 2/2024 | Kirmaier | B60T 8/1708 |
| 2024/0092329 | A1* | 3/2024 | Kirmaier | B60T 8/344 |
| 2024/0198981 | A1* | 6/2024 | Eckert | B60T 13/263 |
| 2024/0270090 | A1* | 8/2024 | Nudda | B60L 15/2054 |
| 2025/0296537 | A1* | 9/2025 | Duke | B62D 59/04 |

FOREIGN PATENT DOCUMENTS

| | | |
|---|---|---|
| EP | 3216333 B1 | 9/2017 |
| EP | 3174767 B1 | 9/2020 |

OTHER PUBLICATIONS

Aykan et al., Evaluation of Tractor-Trailer Combination Braking Performance in Different Operating Conditions, 2023, Süleyman Demirel University Journal of Natural and Applied Sciences vol. 27, Issue 2, pp. 219-225 (Year: 2023).*
Search Report issued in GB2209659.8, dated Dec. 15, 2022.
Search Report for GB2309755.3, dated Aug. 29, 2023.
Extended European Search Report issued in EP 23182151.3, dated Dec. 8, 2023.

* cited by examiner

Ratio Gradient 1200RPM Vehicle Speed Error Negative

ENGINE PERCENT LOAD AT CURRENT SPEED (%)

Ratio Gradient 1200RPM Vehicle Speed Error Zero

ENGINE PERCENT LOAD AT CURRENT SPEED (%)

Ratio Gradient 1200RPM Vehicle Speed Error Positive

ENGINE PERCENT LOAD AT CURRENT SPEED (%)

Ratio Gradient 1400RPM Vehicle Speed Error Negative

ENGINE PERCENT LOAD AT CURRENT SPEED (%)

Ratio Gradient 1400RPM Vehicle Speed Error Zero

Ratio Gradient 1400RPM Vehicle Speed Error Positive

Ratio Gradient 1600RPM Vehicle Speed Error Negative

ENGINE PERCENT LOAD AT CURRENT SPEED (%)

Ratio Gradient 1600RPM Vehicle Speed Error Zero

ENGINE PERCENT LOAD AT CURRENT SPEED (%)

Ratio Gradient 1600RPM Vehicle Speed Error Positive

Ratio Gradient 1800RPM Vehicle Speed Error Negative

Ratio Gradient 2000RPM Vehicle Speed Error Negative

ENGINE PERCENT LOAD AT CURRENT SPEED (%)

Ratio Gradient 2000RPM Vehicle Speed Error Zero

Ratio Gradient 2000RPM Vehicle Speed Error Positive

ENGINE PERCENT LOAD AT CURRENT SPEED (%)

Engine Speed

| | | |
|---|---|---|
| Look-up table 1,1 (Fig 5a) | Look-up table 1,2 (Fig 5d) | ..... Look-up table 1,j (Fig 5m) |
| Look-up table 2,1 (Fig 5b) | Look-up table 2,2 (Fig 5e) | ..... Look-up table 2,j (Fig 5n) |
| Look-up table i,1 (Fig 5c) | Look-up table i,2 (Fig 5f) | ..... Look-up table i,j (Fig 5o) |

Speed error

METHOD AND SYSTEM FOR ENHANCED BRAKING IN A TRACTOR UNIT

FIELD

The present invention relates to controlling the speed and/or braking effort of a vehicle. In particular, though not exclusively, the invention relates to a work machine comprising a continuous variable transmission.

BACKGROUND

A continuous variable transmission, CVT, powertrain provides the capability to change the transmission ratio continuously between 0% and 100%. This allows the engine to be operated at any desired engine speed with the gearing providing no constraint.

CVTs, hydrostatic CVTs in particular, are commonly employed in work machines which utilise hydraulic power for other functions. Such work vehicles might include construction or agricultural machines such as backhoe loaders, slew excavators, telescopic handlers, forklifts, skid-steer loaders, wheel loading shovels, and tractors, for example.

In common with many vehicles, work machines which include a CVT powertrain may include a set speed mode in which the vehicle is configured to maintain a speed selected by an operator without continual input from the operator, e.g. cruise control. Often, particularly with work machines, this is required to maintain the speed under significant variations in load. One way in which this has been addressed is to force an increased engine speed to allow more power to be readily delivered as and when required. This approach impacts on fuel efficiency and also increases the noise and pollution from the vehicle.

Another issue facing work machines, particularly off-highway machines, arises when trailers are towed. Trailers above a given weight are generally required to include brakes which are operated in conjunction with tractor unit brakes. In an agricultural setting, tractor units, e.g. tractors, are often required to tow numerous different implements throughout their working lives. These trailed implements often have diverse braking systems with different control responses which can impact the braking performance which is under the control of the tractor unit without knowledge of the trailed implement of the associated braking performance. Further, off-highway trailed implements are not as closely regulated as those of their on-highway counterparts meaning the performance can unknowingly degrade overtime. This means that the level of braking effort which is applied for a given brake pedal pressure in the tractor unit can vary greatly amongst different tractor unit-trailer combinations.

This can be particularly problematic when the tractor unit out brakes the trailer leading to a potential 'jack-knifing'. 'Jack knifing' refers to the situation where a braking on the trailer is insufficient leading to lateral motion and loss of vehicle control. That is, the trailer tries to move past the towing vehicle due to a lack of braking. As will be appreciated, this is of particular concern when the tractor vehicle is travelling down an incline.

The present disclosure seeks to address at least some of the issues with the prior art arrangements.

SUMMARY

The present invention provides a method and apparatus for controlling the braking effort of a tractor unit and a control system for doing the same according to the appended claims.

The present disclosure provides a method for controlling the braking effort of a tractor unit relative to the braking effort of a trailer being towed by the tractor unit, the method comprising: activating an enhanced braking mode in the tractor unit; receiving a braking command from an operator input device whilst in the enhanced braking mode; increasing a tractor unit motive force required from the tractor unit whilst receiving the braking command, and applying the brakes to the trailer and tractor unit, wherein the braking effort applied to the tractor unit is reduced relative to the trailer due to the increased speed demand.

The increased motive force may be provided by increasing a speed demand from the tractor unit.

The increased speed demand may be determined in relation to the magnitude of the braking command. The magnitude of the braking command may be dependent on the braking pressure provided by the operator input device. The braking pressure may be provided by a braking controller. The tractor unit may comprise a pressure transducer to measure the braking pressure applied by an operator input device such as a brake pedal. Information relating to the braking pressure may be used by other systems in the tractor unit, such as operating the brake lights.

The increased motive force may be provided by increasing a speed demand. The increased speed demand may comprise setting a vehicle speed set-point which is greater than a current vehicle speed. The vehicle speed set-point may be increased above the current vehicle speed in accordance with the braking command. The increase in vehicle speed set-point may be proportional to the braking command. The increase in speed demand for a maximum braking command may be less than 1.5 kph, less than 0.6 kph, preferably less than 0.5 kph, the above the current vehicle speed.

The magnitude of the increase in speed demand may be independent of the current vehicle speed.

The method may further comprise: determining a transmission ratio to provide the vehicle speed set-point. Thus, the present invention may comprise determining a desired increase in speed which is proportional to a braking command provided by an operator, and determining a transmission ratio required to provide the increase in speed.

The transmission ratio may be determined using the acceleration of the vehicle and the engine load as a percentage of a full load.

The method may further comprise determining an engine speed required to deliver the speed with the transmission ratio which has been selected. The engine speed may be determined using the vehicle speed set-point and the transmission ratio.

The transmission ratio may be determined using a plurality of look-up tables. The transmission ratio may be selected using the engine speed, acceleration, engine load as a percentage of the full load and the vehicle speed demand. The look-up tables may be speed control tables used to control the speed of a vehicle in a vehicle set speed mode, e.g. cruise control. The use of the tables used in a set speed mode allows the speed set point determined from the braking command to be used as the speed error which is used to determine a transmission ratio in the speed control method.

The enhanced braking mode may be activated by an operator command.

The trailer brakes may be hydraulic operated. The hydraulic power for the trailer may be provided by the tractor unit. The hydraulic power for the trailer braking may be provided in accordance with the braking command provided by the operator.

The present invention provides a control system for controlling the braking effort of a tractor unit relative to the braking effort of a trailer being towed by the tractor unit, comprising: a processor; and a memory storing a computer program that, when executed by the processor, causes performance of the method as disclosed herein.

The memory may comprise one or more look-up tables. The look-up tables may be configured to provide a transmission ratio gradient for a transmission of the tractor unit. The transmission ratio gradient may be determined using: the acceleration of the tractor unit, the engine load as a percentage of the full engine load, the current vehicle speed and a speed demand.

The control system may further comprise a braking command module, the braking command module being configured to determine a braking effort demanded by an operator of the tractor unit, wherein, optionally, the braking effort is determined from a braking pressure.

The control system may further comprise an electronic control unit, ECU, comprising the processor and memory, wherein, optionally, the ECU is a central ECU which is configured to communicate with an engine ECU and a transmission ECU.

The control system may further comprise an operator input device module configured to receive an enhanced brake mode activation command from an operator input device, wherein the operator input device is a joystick.

The present disclosure provides a tractor unit configured to tow a trailer comprising:

a prime mover; a transmission in which the transmission ratio is controllable via a controller; and, the control system according to the present disclosure, wherein the controller comprises the processor and memory.

The transmission may comprise a hydrostatic continuous variable transmission. The tractor unit may further comprise a trailer.

The present disclosure provides a method for controlling the speed of a vehicle, comprising: receiving a vehicle speed set-point from an operator input device; obtaining a current vehicle speed; and determining a vehicle speed error using the vehicle speed set-point and current vehicle speed.

When the vehicle speed error is positive such that the vehicle speed set-point is greater than the current vehicle speed, a transmission ratio may be increased to accelerate the vehicle towards the speed set-point thereby moving the engine to a full load operating condition. Moving the engine to the full load operating condition may allow the engine speed to be reduced and kept to a minimum.

Additionally or alternatively, when the vehicle speed is negative, the transmission ratio may be reduced to remove engine load and allow the vehicle decelerate towards the speed set-point.

The method may further comprise: obtaining an effective load and, when the vehicle speed error is zero, determining whether the effective load is above an effective load threshold value. When the effective load is less than the effective load threshold value, the transmission ratio may be increased whilst maintaining the vehicle speed to reduce the engine speed.

The transmission ratio may be increased until the engine load is operating at the effective load threshold value or a preferred engine speed is reached. The preferred engine speed may comprise an engine at which fuel efficiency is maximised for the effective load.

The method may further comprise: obtaining a vehicle acceleration and engine load as a percentage of full load and determining the effective load. The vehicle acceleration and engine load may be indicative of and be used to determine the effective load.

In some embodiments, the method of the present disclosure may not utilise an effective load or an effective threshold value. In some embodiments, the transmission ratio may be determined directly from the acceleration and engine load of the vehicle, for example, by using one or more look-up tables.

When the speed error is positive, the method may further comprise obtaining the effective load threshold and determining whether the effective load is greater than an effective load threshold value.

When the effective load is greater than the acceleration threshold value, the transmission ratio may be increased towards a full load operating point. When the effective load is less than the effective load threshold value, the transmission ratio may be decreased to increase the engine speed.

The method may further comprise: obtaining an engine speed, wherein when the speed error is negative, determining whether the engine speed is below an engine speed limit and, if below the engine speed limit decreasing the transmission ratio, and if the engine speed is above the engine speed limit, limiting the engine speed. The engine speed may be limited by decreasing the transmission ratio.

The transmission ratio may be determined using a plurality of look-up tables. The transmission ratio may be selected using a look-up table which is representative of an effective load on the engine. The look-up tables may comprise a four dimensional look-up table comprising variables of the engine speed, a vehicle acceleration, an engine load as a percentage of the full load and the vehicle speed error.

The method may further comprise interpolating a transmission ratio from discrete values provided in the plurality of look-up tables. The plurality of look-up tables may be arranged as a matrix in which each look-up table provides a transmission ratio in accordance with the vehicle acceleration and the engine load. The discrete values may be provided in adjacent look-up tables within the matrix.

Adjacent look-up tables in a column or row of the matrix may represent different current engine speeds, and adjacent look-up tables in the other of a column and row of the matrix represent engine speed error.

The plurality of look-up tables may comprise a plurality of negative vehicle speed error look-up tables, a plurality of zero vehicle speed error look-up tables, and a plurality of positive vehicle speed error look-up tables. Each of the pluralities of negative, zero and positive vehicle speed error look-up tables may each comprise look-up tables corresponding to different engine speeds.

The positive vehicle speed error look-up tables may correspond to values of vehicle speed error between 10 kph to 20 kph, preferably 17 kph. The negative vehicle speed error look-up tables may correspond to values of vehicle speed error between −10 kph to −20 kph, preferably −10 kph. The zero vehicle speed error look-up tables correspond to values of vehicle speed error between −2 kph to +2 kph, preferably 0 kph.

The speed error may be limited. The speed error may be limited in accordance with the effective load, e.g. the acceleration and current load experienced by the engine. The limited speed error may be used to reduce the influence of the positive look-up tables in the interpolation of the transmission ratios when the effective load is high and the acceleration is relatively low. The speed error limit may be determined from a look-up table comprising values of acceleration and percent engine load in association with vales of an upper speed limit.

The transmission ratios provided in the plurality of negative vehicle speed error look-up tables may be the same regardless of engine speed, vehicle acceleration or engine load.

The transmission ratios in the negative vehicle speed error look-up tables may comprise transmission ratio gradients of below, –0.05 or –0.4, preferably –0.3.

The plurality of engine speeds may include values in a range bounded by at least two of: 850 rpm, 1000 rpm, 1200 rpm, 1400 rpm, 1600 rpm, 1800 rpm, 2000 rpm and 2100 rpm.

The present disclosure may provide a control system for controlling the acceleration of a vehicle, comprising: a processor; and a memory storing a computer program that, when executed by the processor, causes performance of the method as disclosed herein. The control system may further comprise: one or more modules configured to sense, measure or determine vehicle data for the processor to carry out the methods disclosed herein.

The present invention provides a vehicle, preferably a work machine, comprising: a prime mover; a transmission in which the transmission ratio is configured to be controlled via a controller; and, the control system disclosed herein, wherein the controller comprises the processor and memory.

The transmission may comprise a hydrostatic continuous variable transmission. The engine may be operated at an engine speed. The engine speed may be controlled by the controller.

The skilled person will appreciate that except where mutually exclusive, a feature described in relation to any one of the aspects, embodiments or examples described herein may be applied mutatis mutandis to any other aspect, embodiment or example. Furthermore, except where mutually exclusive, any feature described herein may be applied to any aspect and/or combined with any other feature described herein.

BRIEF DESCRIPTION OF DRAWINGS

Embodiments will now be described by way of example only with reference to the accompanying figures, in which.

DETAILED DESCRIPTION

In the following detailed description, numerous specific details are set forth in order to provide a thorough understanding of various embodiments and the inventive concept. However, those skilled in the art will understand that: the present invention may be practiced without these specific details or with known equivalents of these specific details; that the present invention is not limited to the described embodiments; and, that the present invention may be practiced in a variety of alternative embodiments. It will also be appreciated that well known methods, procedures, components, and systems may have not been described in detail.

In this disclosure, the term transmission ratio may refer to a specific transmission ratio or a transmission ratio gradient. The transmission ratio may be understood to mean the gear ratio. Although the disclosure primarily relates to continuous variable transmissions, CVT, it will be appreciated that the inventive concepts disclosed herein may be applicable to other forms of variable transmissions such as conventional auto powertrains or drive lines.

The CVT will comprise an input shaft and an output shaft. The transmission ratio of the output shaft to the input shaft, that is, the output shaft speed divided by the input shaft speed. A typical range of transmission ratio is between 0 and 2.5 for a tractor vehicle, but this is not a limitation and other ratios are possible. The transmission ratio of the CVT may be changed by a discrete amount or a rate of change. The rate of change of transmission ratio may be referred to as gradient and may be positive or negative.

The use of the term tractor unit is used in relation to a vehicle used to tow a trailer, rather than an agricultural tractor which may be referred to simply as a 'tractor' in the disclosure.

Figure 1:
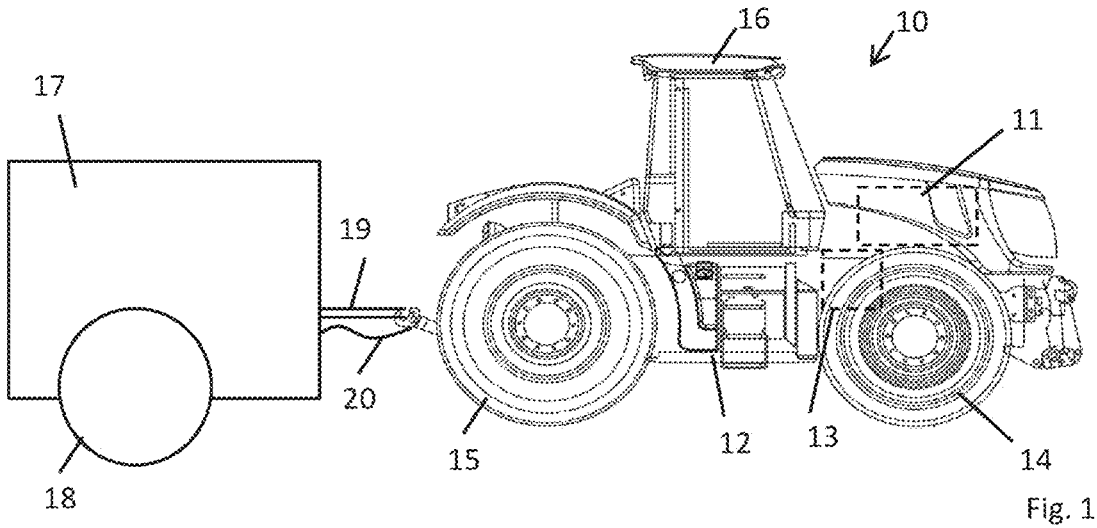
FIG. 1 shows an example of a work machine.

Referring to FIG. 1, there is shown a vehicle 10 which includes a frame structure 12 which in this example includes a chassis and body. The frame structure 12 carries a ground engaging structure which in this example includes a front axle carrying a pair of steerable front wheels 14 and a rear axle carrying a pair of non-steerable rear wheels 15.

In the example, the rear wheels 15 are driveable via a continuous variable transmission 13 by a prime mover, which in the present example is an internal combustion engine 11. In some example all four wheels or indeed only the front wheels 14 may be drivable, depending on the kind of vehicle to which the invention is applied.

The vehicle 10 further includes an operator's cab 16 from where the vehicle 10 may be driven, there being within the cab 16 a steering control e.g. steering wheel or joystick, and an acceleration input device such as a foot pedal or joystick. The speed of the vehicle 10 may be changed by the operator operating the acceleration input device which causes the vehicle control system to adjust the transmission ratio between the engine and the driven wheels 15 and/or to increase the engine speed. A brake control may be provided in the form of a brake pedal or by joystick control.

The vehicle shown in FIG. 1 is a work vehicle in the form of a tractor, but the present disclosure may be applied to other forms of vehicle where appropriate. The types of vehicle may comprise any with an automatic drive line and an engine with a torque curve.

The CVT may be any suitable CVT and may be mechanical, electrical or hydraulic based. In the described example, the CVT may be assumed to be a hydrostatic drive in which a variable displacement hydraulic pump and motor are controlled to provide a desired gear ratio, typically by adjusting the swash plate angle within the pump. Hence, the adjustment of the transmission ratio may comprise the control system altering the swash plate angle by a predetermined amount or at a predetermined rate.

The engine speed and transmission ratio may be independently adjustable. The speed of the engine may be controlled by a controller via a conventional control area network bus. The speed of the engine may also be controlled by an operator input device such as a throttle pedal or lever with a range that can be changed. However, it will be appreciated that the engine speed operator input device may be overridden by the controller to enable the control system to control the engine response.

In the present disclosure, the vehicle speed may be set by an operator so that the vehicle maintains the set speed without continuous interaction from the operator, regardless of the effective load the tractor is experiencing. Whilst operating at the vehicle speed set-point, the vehicle control system is configured to manage the transmission ratio to ensure that variations in the effective load can be accommodated without significant loss of speed. The transmission ratio may be controlled to operate the engine close to or at a full load condition when the effective load on the vehicle is low. In some embodiments, the transmission ratio may be controlled to operate the engine at higher speeds to increase the power output of the engine, particularly when the effective load is high.

The effective load on the vehicle may be affected by, for example, the type of and/or topology of and/or change in the terrain, and/or whether the vehicle is towing or has a work implement operating or in the ground etc. For example, where a vehicle is travelling at steady state on an incline, the load will be increased due to the incline compared to the same vehicle travelling on the flat or downhill. Thus, if the speed is set at a particular point, the control system must be configured to adjust the motive force produced by the engine to account for these changes, either by reducing or increasing the torque or power output as required.

The effective load may be used to determine the transmission ratio required to drive the vehicle at the vehicle speed set-point.

Figure 2:
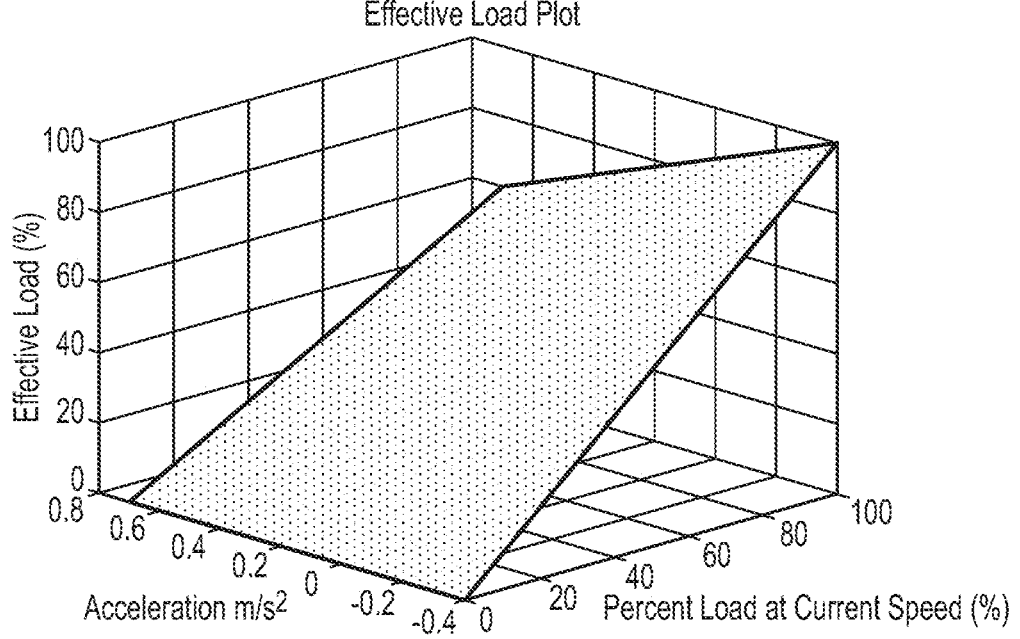
FIG. 2 shows a plot representing a look-up table for determining an effective load of a vehicle.

FIG. 2 shows a plot in which acceleration of the vehicle is shown in the x axis, the percentage load on the engine is shown on the y-axis, and the effective load is shown in the z-axis. The plot may provide the basis for a look-up table from which, for a given acceleration it is possible to determine the effective load on the engine. Thus, for example, where there has been an initial acceleration of 0.2 m/s2 following an initial increase in transmission ratio and the load on the engine is known to be 60%, it may be possible to determine an effective load of 37%.

It is of note that the plot includes negative values of acceleration which may occur when the effective load changes, for example, if the engine is at full load and the vehicle starts ascending an incline.

Once the effective load has been determined, the control system may use it to determine whether the speed error can be met at the current engine speed, and, if not, what engine speed is required to provide the reduce the speed error to zero. To determine the desired engine speed, the control system may be provided with a look-up table which includes the engine speed and effective load extending between 0 and 100% for example. If the effective load is low, then the engine may be operated on peak torque without a change in the engine speed to provide the necessary acceleration to reduce the speed error. If the effective load is high, then the engine may be operated at peak power. It will be appreciated, that the specific engine speed required may be determined and the disclosure is not limited to determining the full load or peak power.

In other embodiments, the transmission ratio may be determined directly using the vehicle acceleration and engine load with suitable look-up tables. Hence, with reference to FIG. 2, instead of having the acceleration and load associated with an effective load, the look-up table could provide a value of transmission ratio. This is discussed in further detail in connection with FIGS. 5a-5o further below.

Figure 3:
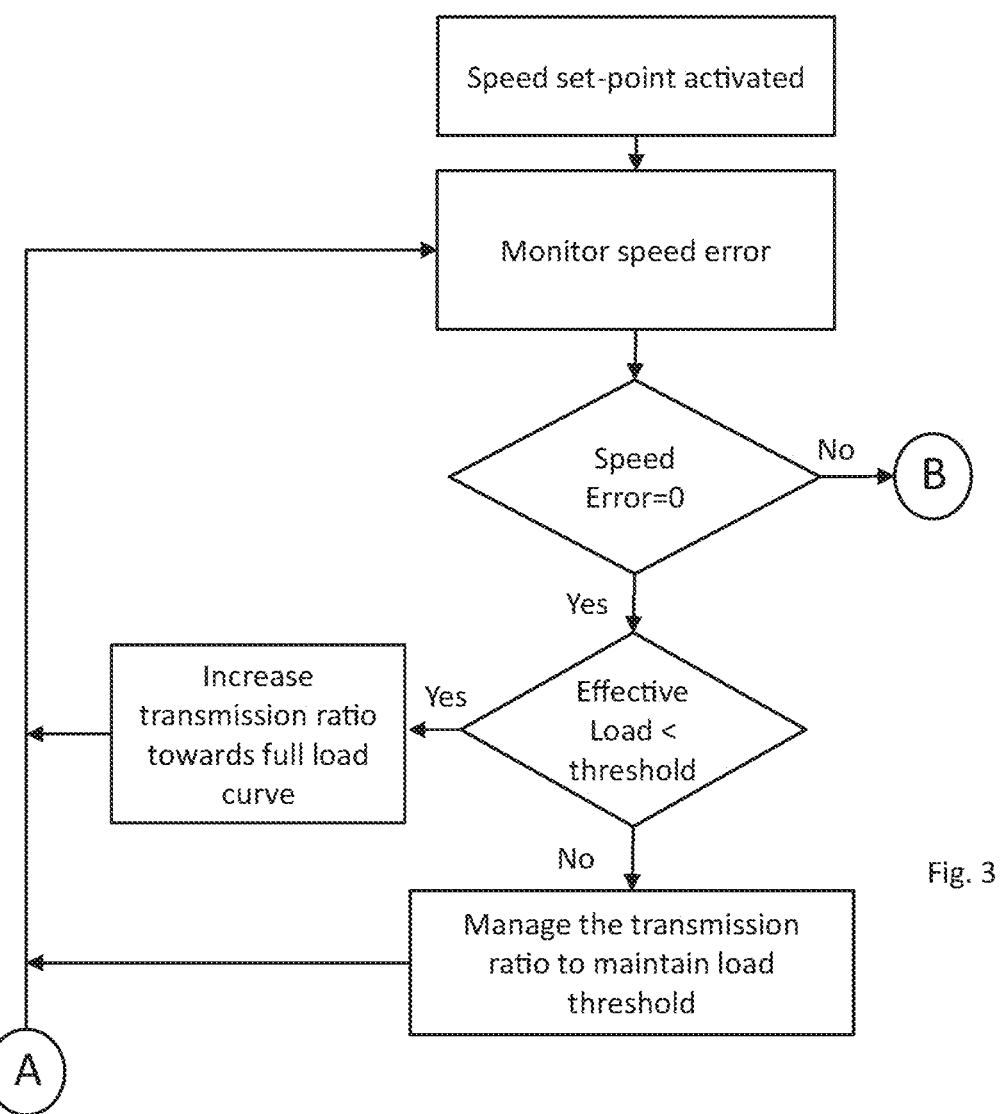
FIGS. 3 and 4 together show a flow diagram for controlling the speed of a vehicle according to the present disclosure.
Figure 4:
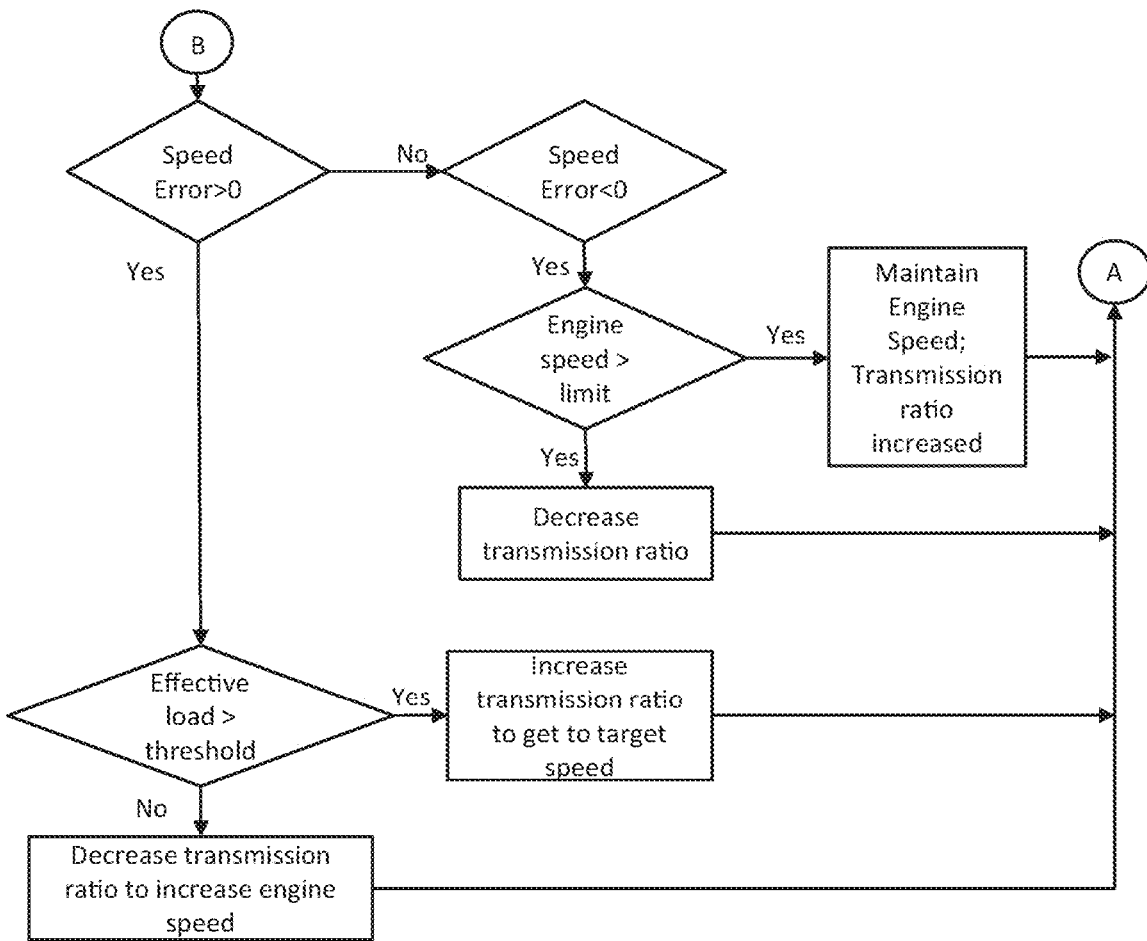

Turning to FIGS. 3 and 4, there is shown a single flow diagram indicating the main steps in a method according to the present disclosure. It will be appreciated that FIGS. 3 and 4 have corresponding nodes A and B by which the two drawings can be joined to provide a single flow diagram.

FIG. 3 shows the start of the method in which a set speed mode of operation is selected by the operator. The activation of the set speed mode may be achieved using any suitable operator input device, known in the art. The device may comprise a push button, toggle, joystick, lever, pedal, display or any combination of these things. For example, the operator may be able to select a set speed mode by pressing a button on the joystick control which activates the set speed mode and sets the speed set-point at the current vehicle speed. In other embodiments, the set speed mode may be achieved by a dual action such as pressing a button on a joystick whilst moving the joystick in a pre-configured way or direction. In yet other embodiments, the operator may be able to activate the set speed mode and select the speed set-point on a touch screen display or using a voice command, for example. It may also be possible to adjust the speed set-point once the set speed mode has been activated, for example, by increasing or decreasing the speed set-point to fine tune the selected speed. Other combinations of activation and speed selection are possible and the above are merely examples.

Once activated, the control system may be configured to determine a speed error. The speed error provides an indication as to the current vehicle speed in relation to the desired vehicle speed. The speed error may be determined as the desired speed or vehicle speed set-point speed, minus the current vehicle speed. Hence, if the speed error is positive, the vehicle is travelling below the vehicle speed set-point, and if the speed error is negative, the vehicle is travelling above the vehicle speed set-point.

FIG. 3 shows the method where the speed error is zero or near zero. FIG. 4, which is an extension of FIG. 3 via nodes A and B as noted, shows the method where the speed error is positive (speed error >0) and negative (speed error <0). The values for positive, zero and negative speed error will be application specific. In some embodiments, the positive values may any taken from the range bounded by 10 kph to 20 kph. In some embodiments, the negative values may be any taken from the range bounded by −5 kph to −20 kph. In some embodiments, the zero value may be any value taken from the range bounded by −2 kph to 2 kph. These ranges are not limiting and others may be possible. Further, it is to be noted that in the example of FIGS. 5a-5o in which look-up tables are utilised to select the transmission ratio, interpolation may be used to select the actual value from between the adjacent look-up tables which may impact the values of the speed errors associated with the look-up tables and the spacing and number of the look-up tables.

Referring firstly to FIG. 3 and the case where the speed error is zero or near zero, the method proceeds to determine whether an effective load is less than a predetermined threshold. Where the effective load is below a pre-determined threshold the transmission ratio is increased to increase the load on the engine and reduce engine speed. In doing so, where the engine speed is higher than a desired set point, for example, for optimum efficiency, the engine speed can be reduced to the desired engine speed and an improvement in efficiency. The engine speed may be higher, for example, where the effective load has reduced. Hence, the present disclosure increases the engine load towards a full load operating point, that is, on the full load curve of the engine, so as to avoid having the engine running at higher than necessary revs, and helps maximise operating efficiency.

As noted, the choice of the effective load threshold may be dictated by an engine operating parameter of choice, such as efficiency and/or engine speed and/or responsiveness. Hence, for example, the engine may operate most efficiently when on or close to the full load curve. Hence, the engine speed may be controlled via the transmission ratio to load the engine to a predetermined amount. The load threshold may be, for example, 80%, 90%, 95% or 100% of the full load for example.

If the effective load is at or above the threshold, the transmission ratio may be continually managed to maintain the speed of the vehicle and manage the effective load which may be continually varying in some scenarios. Thus, where there is no speed error and no instantaneous acceleration, the engine should proceed at a steady speed with the same transmission ratio. Where the effective load on the vehicle changes are relatively small, the increase in effective load may slow the engine speed down for the current transmission ratio. This in turn may move the operating point down the torque curve to provide more load for the engine to increase the torque and adjust to the higher effective load. As such, the engine may act to dampen small perturbations in the effective load without needing to change the transmission ratio.

Where there is a significant acceleration or deceleration, the engine speed error may be sufficient to require a change in transmission ratio or engine speed. Thus, the transmission ratio may be reduced to reduce the engine load and allow the effective load and, optionally, engine braking or an auto-braking system to slow the vehicle. Where there is a deceleration, the transmission ratio and/or engine speed may be increased to provide more motive force. With reference to FIG. 4, where there is a deceleration, the speed error will become positive and move to the first branch on FIG. 4 via node B. Here, the control system monitors the effective load against a predetermined threshold. If the threshold is above the threshold, then the control system may be configured to increase the transmission ratio towards the full load curve. In doing so, the vehicle will accelerate to reduce the speed error.

In the alternative, if the effective load is below the threshold, the transmission ratio is reduced to increase the engine speed. Thus, where there is insufficient acceleration to reduce the speed error, it is indicative that the engine has insufficient load capacity at the present engine speed and more power is required.

The effective load threshold may be different or the same for different speed errors, and the effective load threshold may be dependent on the speed error and/or the engine speed.

As can be seen, following the increase or decrease in transmission ratio, the control loop flows back to FIG. 3 via node A and proceeds to monitor the speed in the next time step, repeating the process already described. Each iteration of the control loop may be determined by a clock speed of the control system and may be 50 ms, for example.

In the event that the speed error is negative and the vehicle is travelling too fast, for example where effective load has been removed from the vehicle of the speed set-point has been reduced, the engine speed may be monitored against an engine speed limit threshold. If the engine speed is above the threshold, the transmission ratio may be decreased to remove load off the engine and allow the vehicle to slow under the remaining effective load and engine braking, thereby reducing the engine speed error. In some cases, the reduction of the effective load may be large or continuous leading to a scenario where the engine speed runs away, in which case the engine speed may also be limited by increasing the transmission ratio and forcing the operator to use the brakes to slow the vehicle.

It will be appreciated that although FIGS. 3 and 4 show a sequential decision in relation to the speed error and whether it is zero, positive or negative, this is for convenience of explanation and the speed error may be monitored continuously with the appropriate branch of the flow diagram being chosen accordingly.

As noted, the present disclosure teaches the use of a plurality of look-up tables to allow the correct value of transmission ratio to be chosen. Thus, as shown in FIGS. 4a-4o there is shown a plurality of look-up tables each providing a transmission ratio for a plurality of different variables. As can be seen each of the look-up tables provides transmission ratios for different values of acceleration and engine load at a given speed. Each look-up table is additionally associated with a given engine speed and speed error value to provide a four dimensional look-up table.

Figure 5A:
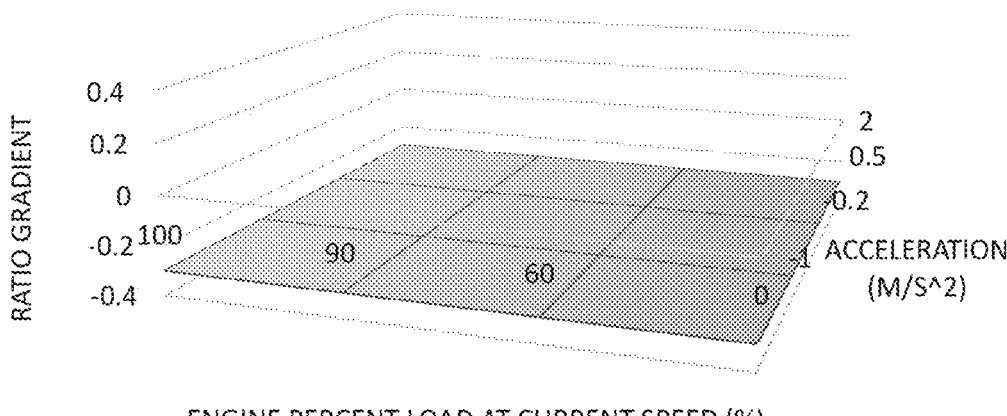
FIGS. 5a to 5o show look-up tables which may be implemented to control the speed of a vehicle or the implement the method of the present disclosure.
Figure 5B:
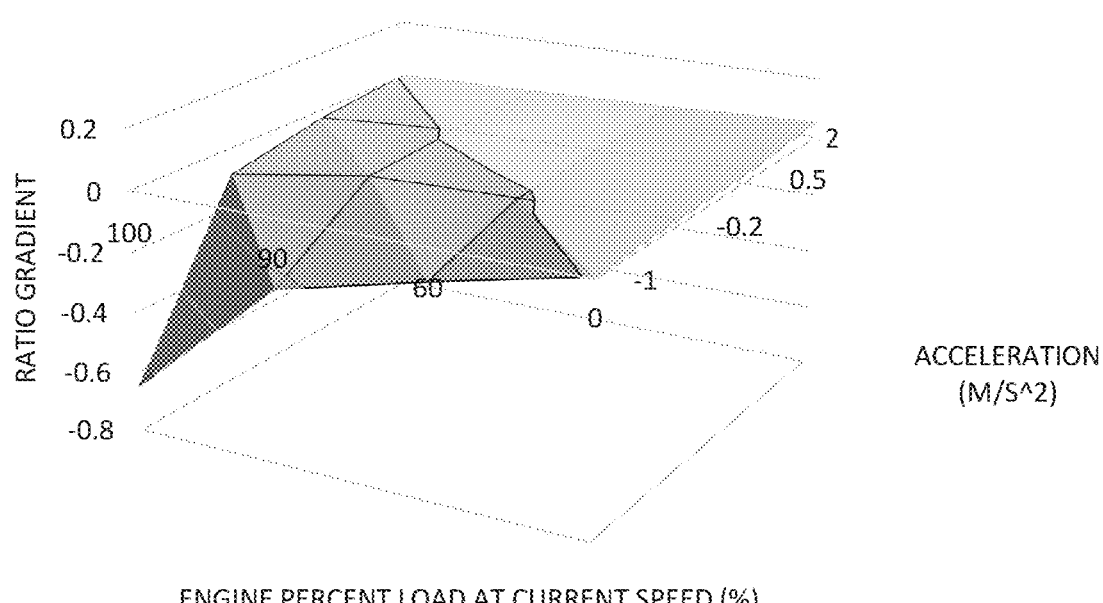
Figure 5C:
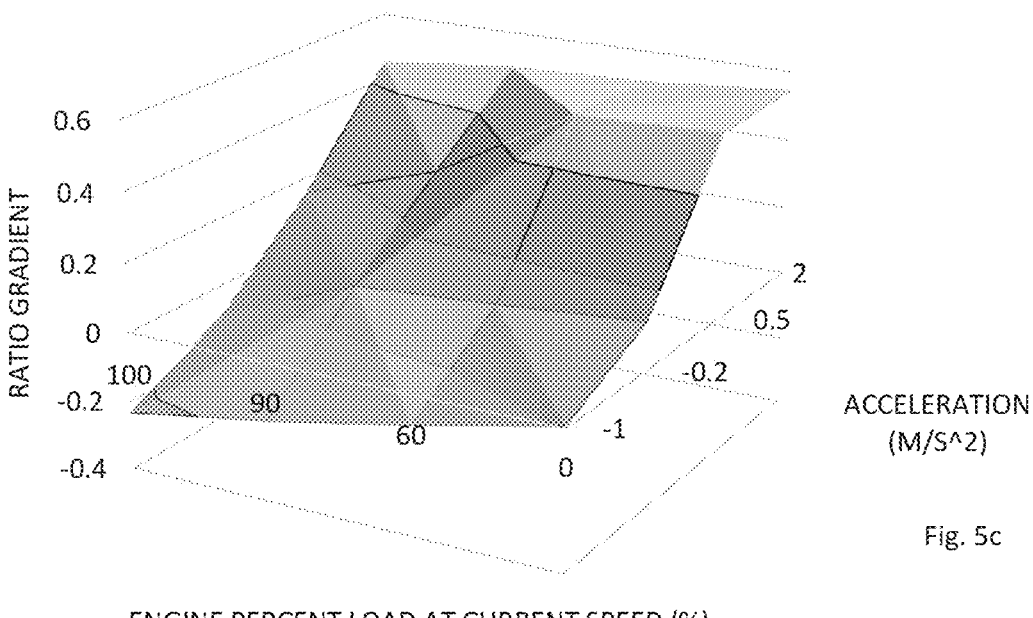
Figure 5D:
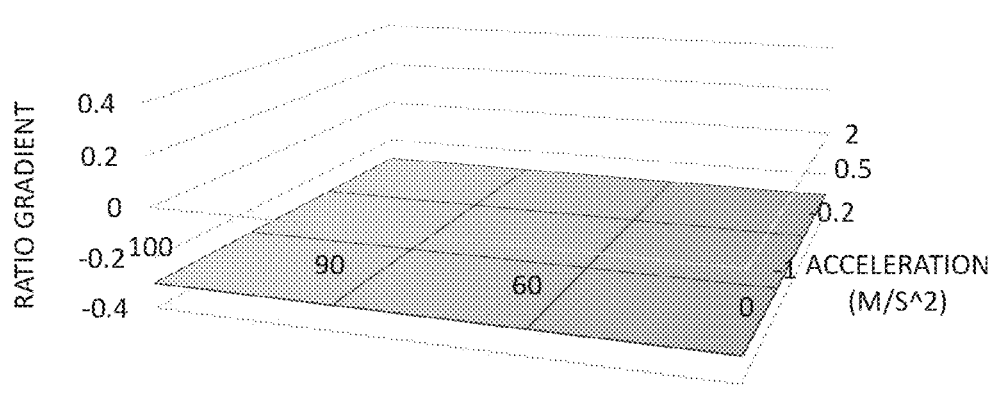
Figure 5E:
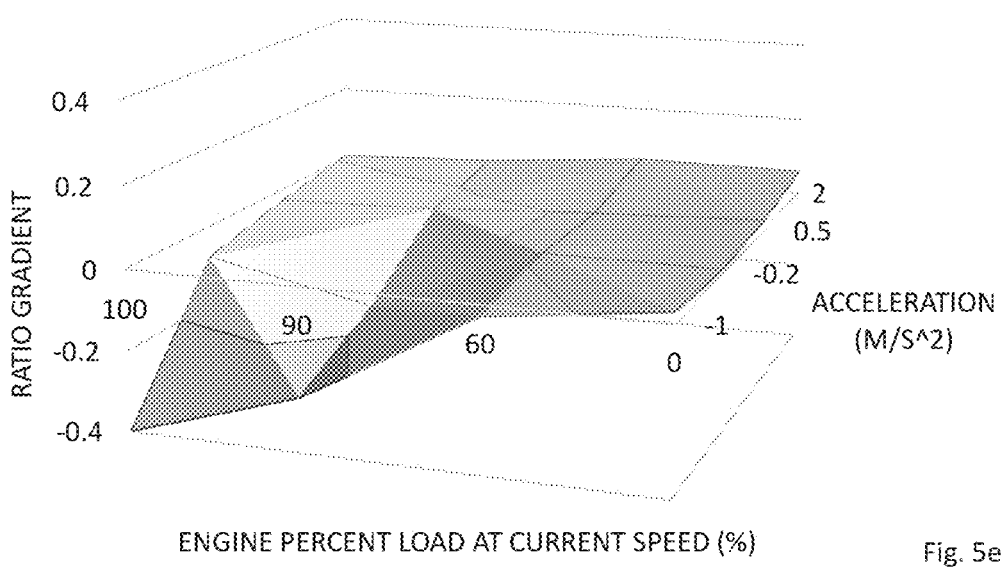
Figure 5F:
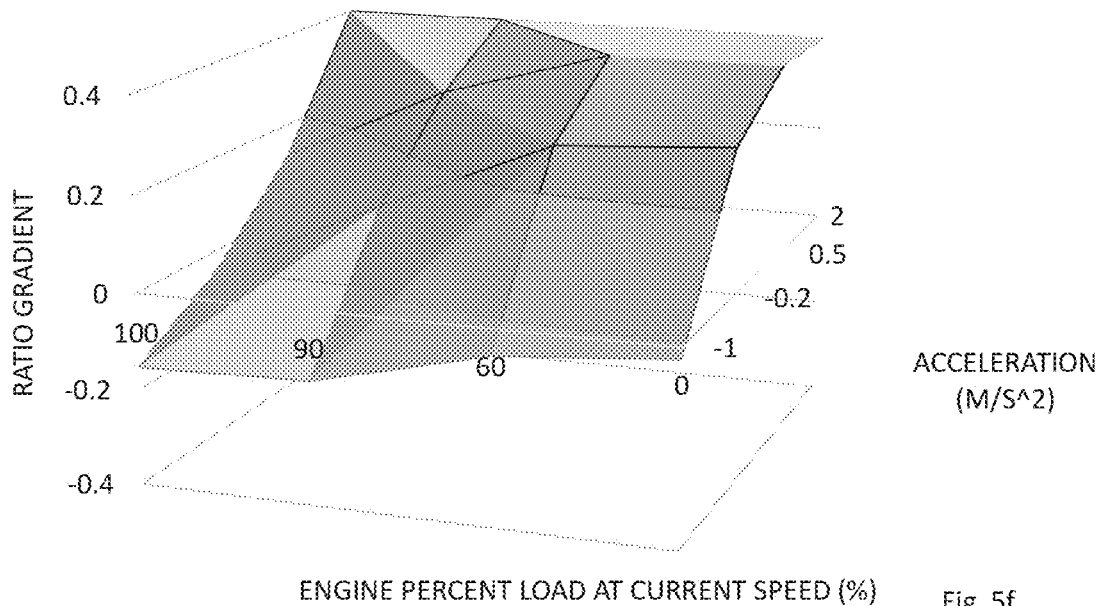
Figure 5G:
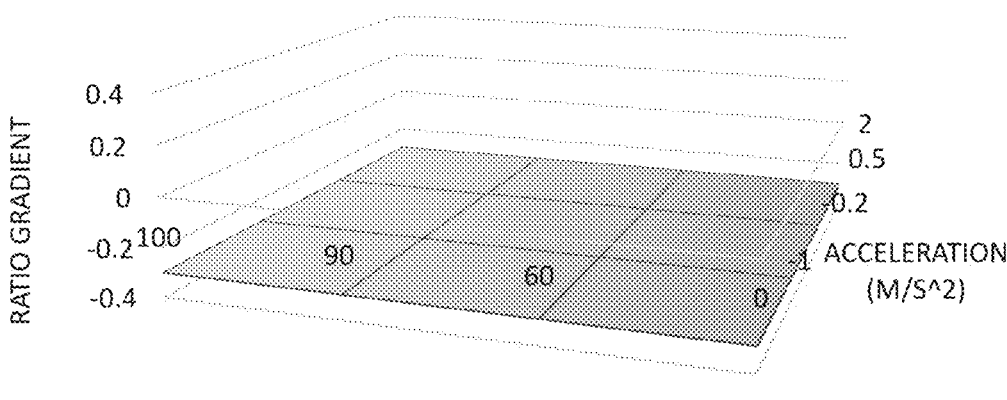
Figure 5H:
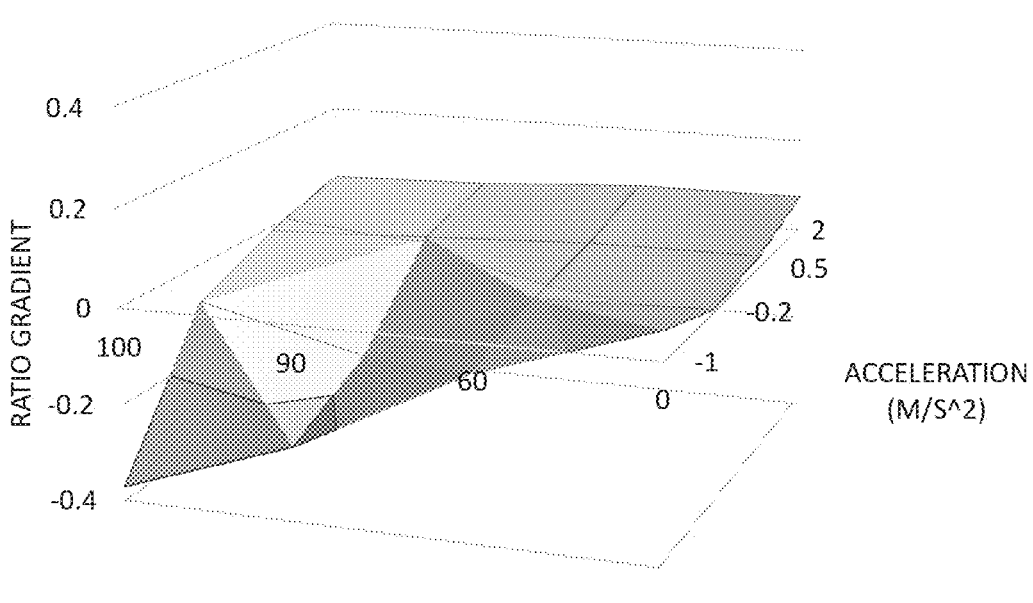
Figure 5I:
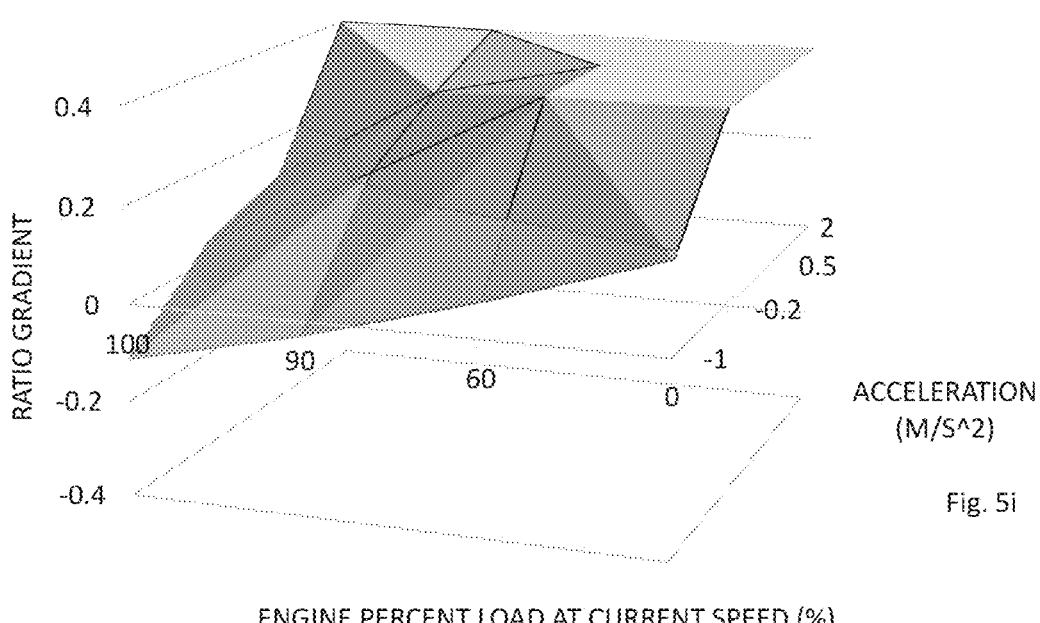
Figure 5J:
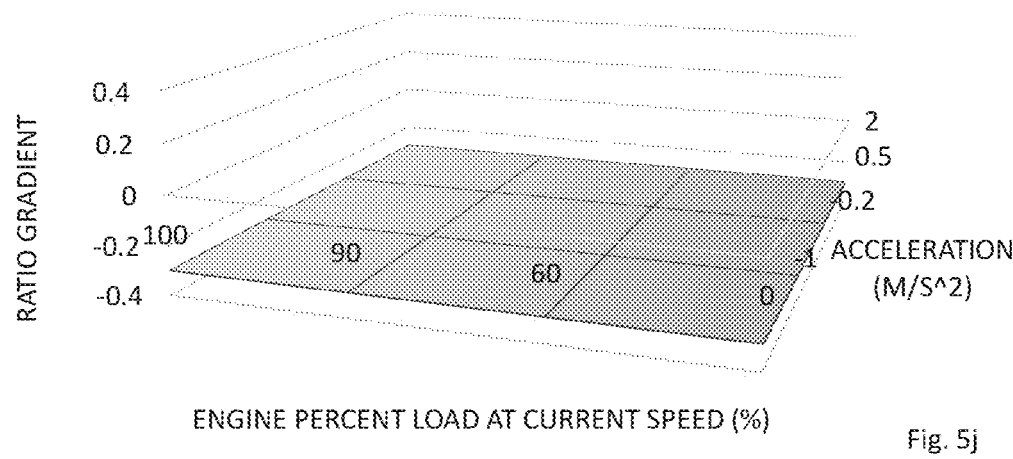
Figure 5K:
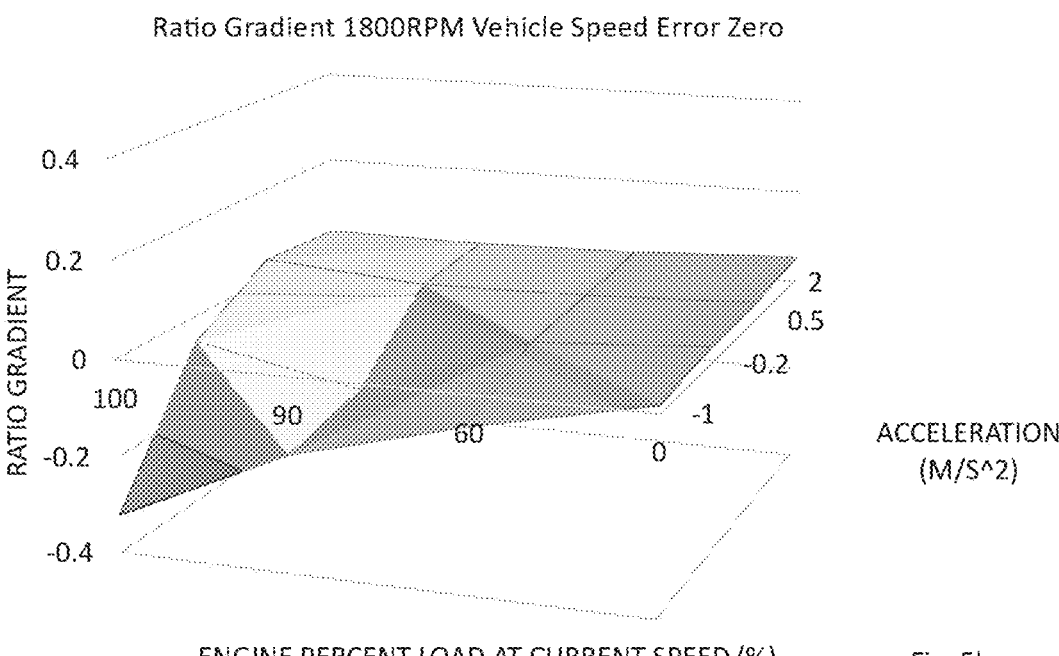
Figure 5L:
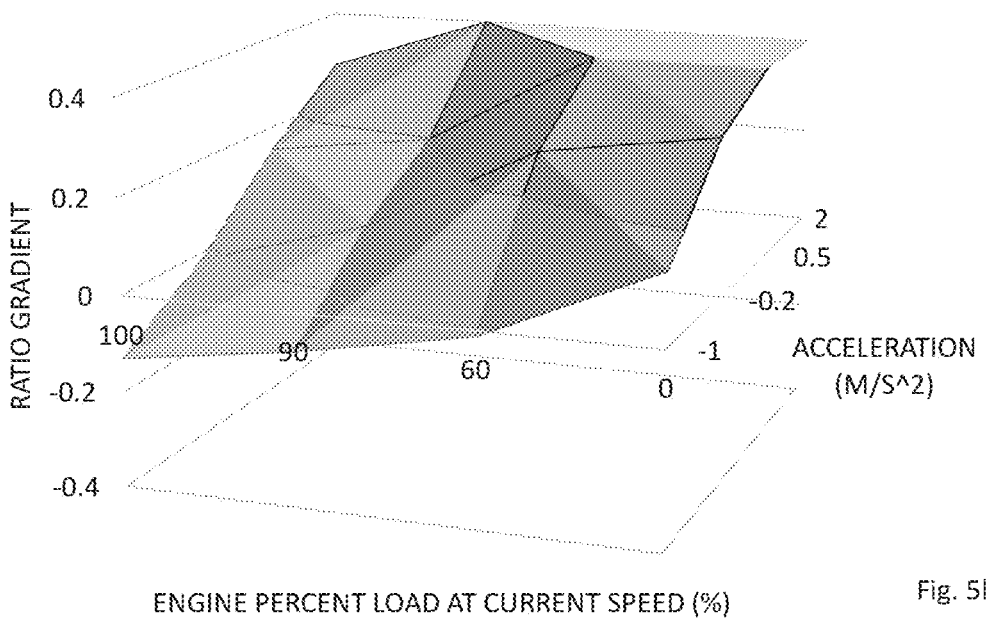
Figure 5M:
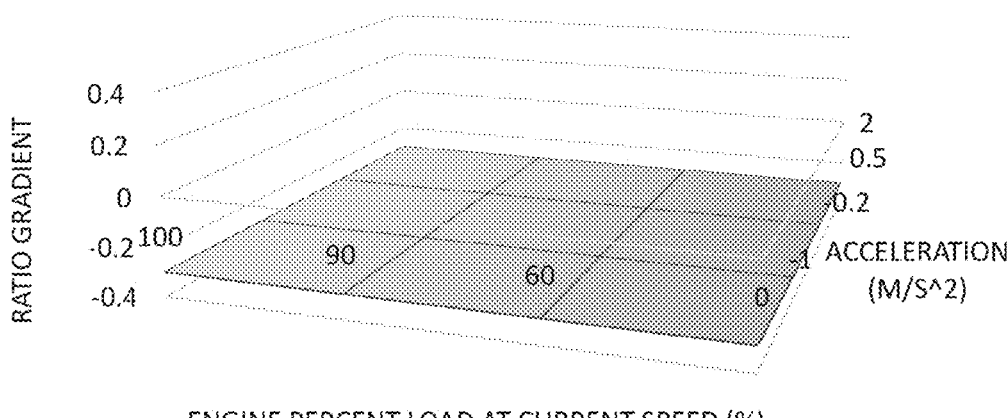
Figure 5N:
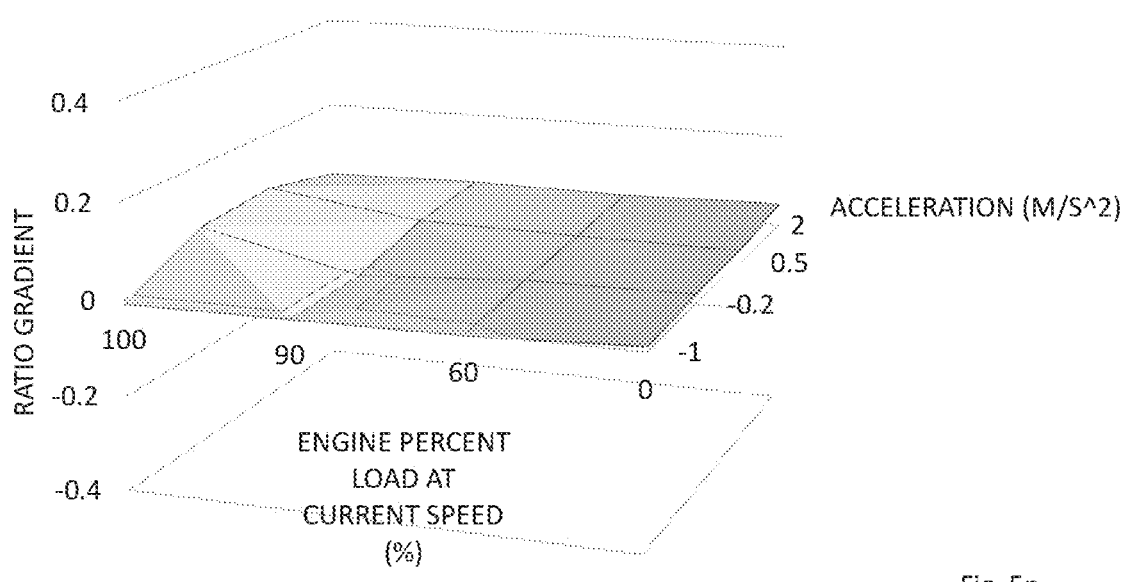
Figures 5O, 6:
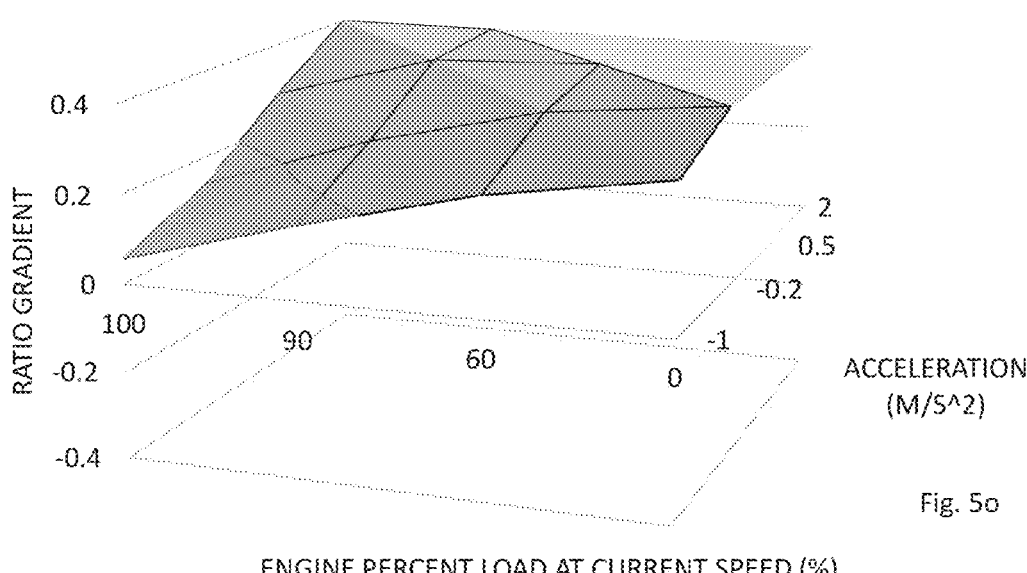
FIG. 6 shows a matrix of look-up tables which may comprise the look-up tables shown in FIGS. 5a to 5o.
Figure 7:
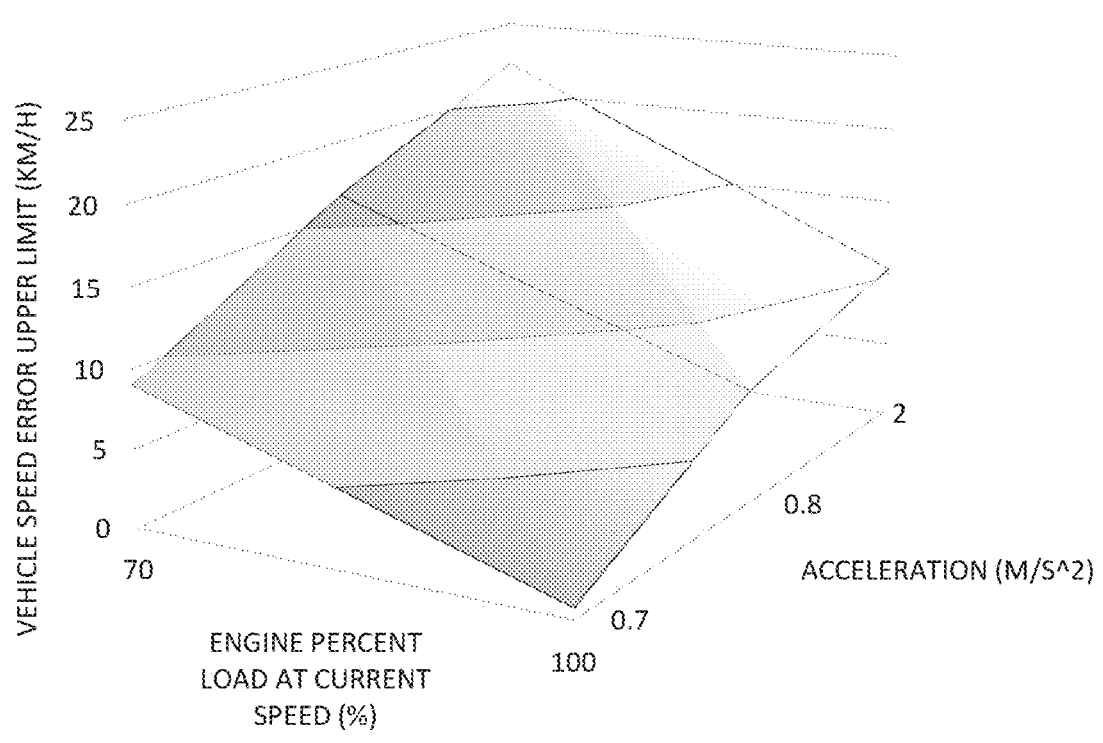
FIG. 7 shows a speed error limiter look-up table.

As shown in FIG. 6, the plurality of look-up tables may be provided as a matrix having i rows and j columns. In the example shown, the columns may each be associated with a value of engine speed and the rows may be each associated with a value of speed error. The number of rows and columns may vary, as may the specific variable associated with each. Hence, for example, the rows and columns may be interchangeable and may, in some embodiments, represent different variables.

The matrix of look-up tables provides a distribution of discrete transmission ratio gradients for four different variables: engine speed, speed error, acceleration and engine load, thereby providing a four dimensional look-up table. The four different variables make it possible to adjust the transmission ratio of the vehicle to provide a speed control method in which the engine is efficiently operated whilst providing a responsive system which can tolerate significant changes in the effective load the vehicle is subjected to.

It will be appreciated that the transmission ratio gradients are arranged within each of the look-up tables to ensure there is a smooth transition between points as the load and the acceleration changes, and also that the transition between look-up tables is also smooth and continuous. In order to achieve this using the discrete data points provided in the look-up tables, the control system may be configured to interpolate between adjacent data points in a given look-up table and between adjacent maps in the matrix.

The interpolation may comprise, for example, selecting corresponding values from adjacent look-up tables, e.g. adjacent engine speeds, and interpolating between the two values. Hence, for example, if the engine speed is currently 1300 rpm, the control system may select corresponding values for the engine load and acceleration from each of the 1200 rpm and 1400 rpm look-up tables (FIGS. 5a-c and FIGS. 5d-f) and interpolate between the two data points to obtain the transmission ratio which is suitable for the actual engine speed. A similar process may be carried out for the other variables used in the method. Hence, for example, the engine speed error may be interpolated using the positive and zero vehicle speed error look-up tables.

The interpolation may be carried out using any suitable technique known in the art. The interpolation may comprise, for example: linear interpolation which assumes a slope between the two data points and selects the value at the appropriate point on the slope. Other methods of interpolation will be possible.

With reference to FIG. 6, FIGS. 5a-c correspond to the first column of the matrix and represent a common engine speed of 1200 rpm for negative, zero and positive speed errors, FIGS. 5d-f correspond to the second row and represent a common engine speed of 1400 rpm for negative, zero and positive speed errors, FIGS. 5g-i correspond to the third row and represent a common engine speed of 1600 rpm for negative, zero and positive speed errors, FIGS. 5j-1 to the fourth row and represent a common engine speed of 1800 rpm for negative, zero and positive speed errors, and FIGS. 5m-o correspond to the fifth row and represent a common engine speed of 2000 rpm for negative, zero and positive speed errors. As noted above, the numbers of rows and the associated values may vary according to the application and the accuracy required for the transmission ratio.

The look-up tables use the acceleration and engine load as a percentage of the full load to determine the appropriate transmission ratio. Generally, this leads to a situation in which, when the engine load is high and acceleration low, the transmission ratio is removed, and where the percentage engine load is low, and the acceleration is high, the transmission ratio is added. As such, load is increased at low loads and engine speed is increased at high loads to provide more power, with increased effect in dependence of the acceleration. Hence, a high load deceleration leads to a severe reduction in transmission ratio, and a low load high acceleration leads to an increase in transmission ration and slowing of the engine.

In the case of a positive speed error, the transmission ratio is generally increased unless the acceleration is negative and the load is high.

In the present embodiment, the negative speed error look-up tables are all the same regardless of the engine speed. The reason for this is to allow the load to be rapidly taken off the engine and use engine braking to decelerate the vehicle. As will be appreciated, the interpolation between adjacent look-up tables means that the transmission ratio will not move abruptly to the transmission reduction shown without the speed error becoming relatively large. However, providing a severe transmission ratio reduction may allow for a uniform response and slowing of the vehicle if the operator reduces the speed set-point whilst the set speed mode is activating. Hence, in the scenario where an operator drops the speed set-point, the speed error immediately goes negative and the transmission ratio is taken off rapidly to provide a suitable response for the operator.

The rate at which the transmission ration is removed in the case of a large negative speed error may be any suitable amount. In the present embodiment, the rate the transmission ratio is removed, i.e. the transmission ratio gradient, is −0.3. However, this may be anywhere between −0.05 and −0.5.

The specific values of the transmission ratio gradients according to the present disclosure may be broadly determined from the look-up tables. However, it will be appreciated that the specific values will be application specific and some trial and error may be required in some cases. Similar, the values the engine speed may vary between, for example, 850 rpm and 2100 rpm, with any desired number and distribution of look-up tables therebetween. In some embodiments, the positive values of speed error may be any taken from the range bounded by 10 kph to 20 kph. In some embodiments, the negative values may be any taken from the range bounded by −5 kph to −20 kph. In some embodiments, the zero value may be any value taken from the range bounded by −2 kph to 2 kph.

In some embodiments, the selection of the look-up tables, or the effect a look-up table has on the interpolation and selection of the transmission ratio may be controlled in certain circumstances. Hence, for example, where the effective load is high, that is, the acceleration is low and the engine load is high, the control system may be configured to use a speed error limiter such that the transmission ratio is selected from or close to the zero look-up tables. In doing so, it helps avoid large increases in transmission ratio which require an increase in engine speed.

Figure 8:
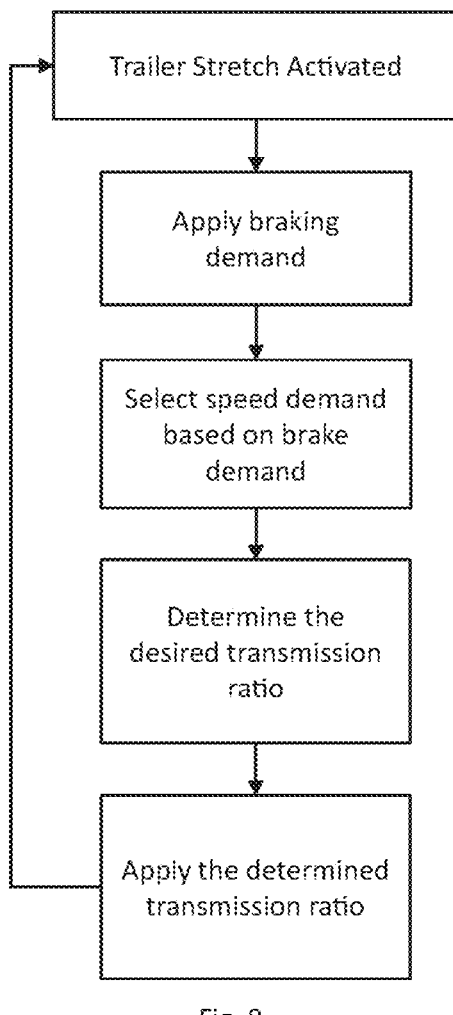
FIG. 8 shows a flow diagram for controlling the braking of a tractor unit.
Figure 9:
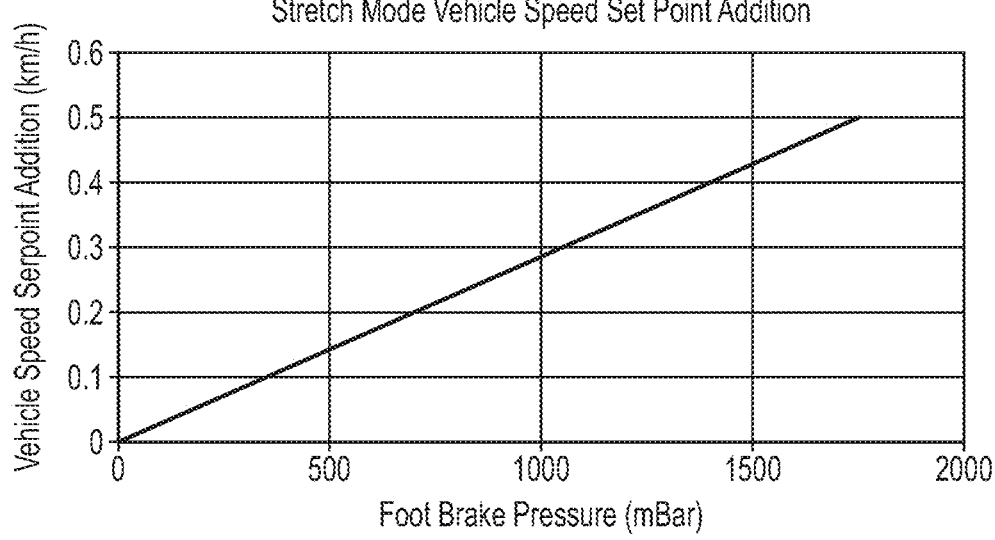
FIG. 9 shows a look-up table for determining a vehicle speed demand in dependence of a brake command.

FIG. 8 shows a look-up table which provides a fifth dimension to the look-up tables disclosed in FIGS. 5a-5o. Here, the effective load, that is, the acceleration and the engine load at the current speed, is used to determine a speed error upper limit so that the influence of the high speed error plots is limited. Thus, where the acceleration is low, e.g. 0.7 $ms^{-2}$, and the engine per load is high, e.g. 100%, the speed error may be limited to 1 kph, meaning the transmission ration is selected from the zero look-up tables. Where the engine load is low, e.g. 70% of the full load condition, and the acceleration is high, e.g. 2 $ms^{-2}$, the speed error limit may be effectively removed allowing the positive speed error look-up tables to become more influential in the interpolation and selection of the transmission ratio.

As will be appreciated, the control system may be dynamic so as to repeatedly adjust the speed demand in accordance with current operating condition of the vehicle and the braking demand. Hence, FIGS. 2 and 3 and be continuously cycled through in accordance to a clock frequency or the like of the ECU, for example every 50 ms. Similarly, the selection of the transmission ratio gradient from FIGS. 4a-4o may be continuously updated to provide a smooth transition between transmission ratios in keeping with current operating conditions.

The present disclosure provides a method of controlling the braking force of a trailer relative to the braking force of a towing vehicle comprising: receiving a braking command from an operator input device; increasing a motive force from the traction unit, e.g. by increasing a speed demand, whilst receiving the braking command; and applying the brakes to the trailer and traction unit, wherein the braking effort applied by the traction unit is reduced relative to the trailer due to the increased motive force.

Thus, the present disclosure provides a way of increasing the output of the engine and forcibly driving the traction unit through a portion of the braking effort to effectively reduce the effective braking effort in relation to the level braking demand. As the braking effort applied to the trailer is in line with the braking command, the braking effort by the trailer is increased relative to the traction unit for a given braking command. In doing so, it increases the relative braking force of the trailer thereby reducing the chances of the trailer becoming unstable and shifting laterally or jack-knifing.

The trailer may comprise any form of towed vehicle or implement and may comprise a chassis, at least one pair of wheels, a coupling to attach the trailer to the tractor unit and a brake system couplable to and controllable by the tractor unit. The brake system may be hydraulically operated. Returning to FIG. 1 there is shown a trailer 17 comprising wheels 18 and a tow bar or drawbar 19 and a hydraulic line 20 providing the hydraulic power for the trailer brakes (not shown).

The present disclosure provides a method of controlling the braking effort of the using the engine of the tractor unit. In some embodiments, this may be achieved using existing engine control algorithms and data, such as the speed control methods disclosed herein. Hence, the present disclosure provides a way of controlling the braking of a trailer using an engine control method without the use of ancillary hardware to control the braking effort of the trailer, such as an additional proportional valve or similar in the hydraulic brake line which operates the trailer brakes, or a sensor on the tow bar. IN particular, the present disclosure provides a way of increasing the motive force provided by a traction unit by increasing forcing a speed error in a speed control system. As such, there is an increased speed demand which forces the engine to produce more motive power.

FIG. 8 shows a method flow diagram according to the present disclosure. The method starts with a vehicle operator choosing an enhanced braking mode, which may be referred to as a trailer stretch mode, to provide the differential braking between the trailer and tractor unit. The trailer stretch mode may be activated using any known input device such as a push button, toggle, joystick, lever, pedal, display or any combination of these. For example, the operator may be able to select trailer stretch mode by pressing a button on the joystick control or by pressing a button on a joystick whilst moving the joystick in a pre-configured direction. In yet other embodiments, the operator may be able to activate the trailer stretch mode on a touch screen display or using a voice command, for example. Other combinations of activation are possible.

The trailer stretch mode may only be activated during a braking event. Hence, in some embodiments, the trailer stretch mode may require an operator to actuate an operator braking device, such as a brake pedal, joystick or lever for example, simultaneously with the trailer stretch mode using a further operator input device such as the aforementioned buttons, joysticks, or touch screen, for example.

Once the trailer stretch mode has been activated, the control system may be used to determine a required increase in the motive force for the engine to provide. The increase in motive force may be realised by increasing a speed demand from a speed control system. Hence, the control system may create an increased target speed for the vehicle so that the increase motive force to achieve the increased target speed is sufficient to overcome a proportion of the braking effort, thereby reducing the effectiveness of the tractor unit brakes in relation to the trailer brakes for a common amount of braking demand.

The increase in motive force may correspond to the level of braking demand issued by the operator. In the case where the operator uses a braking input device such as a brake pedal, the pedal position may be used to determine the amount of additional motive power which is required. Additionally or alternatively, the braking pressure applied by the pedal or within the braking system may be used to determine the amount of additional motive power which is required. The braking pressure may be obtained using any known suitable transducers or sensors. In some embodiments, the braking pressure may be acquired by an ECU provided within the vehicle and may be used for other purposes such as activating the brake lights or similar.

The relationship between the brake demand and the increase in motive force may be proportional. FIG. 8 shows a relationship between a brake demand, in this case, braking pressure, and an increase in speed above the current vehicle speed. The brake pedal pressure represents a full range of the brake pedal pressure which may be demanded on the vehicle in question. Hence, the zero percent position on the brake pedal corresponds to a zero pressure, and the 100% pedal position corresponds to the 1750 mBar position on the right. The corresponding increase in speed demand is, as a percentage of the vehicle speed, much reduced, with the minimum being 0 km/h, and the maximum being 0.5 km/h. Hence, the constant of proportionality may be low such that the increase in speed demand and motive force is relatively low and may be as little as 2% as a maximum. It will be appreciated that providing too much increase in the motive power will result in unnecessary losses in the braking system, and a low level of additional speed demand is sufficient to provide the required braking differential between the tractor unit and trailer. The above figures for pressure and speed increase are examples only and other levels of pressure and speed increase are possible within the present disclosure.

The increase in speed demand may be used to provide an increased speed target for the engine to achieve whilst the brakes are being applied in the enhanced braking mode. One way this may be achieved is to use the speed demand as the speed error in the look-up tables shown in FIG. 5*a*-5*o* which are described above for the speed control method. Hence, in the context of the speed control description above, the speed demand determined from requested braking effort may represent the difference between a desired speed and a current vehicle speed. Adding the speed error to the current vehicle speed may therefore set a new target set-point for the vehicle which the control system may utilise to provide the increased motive power.

As noted, the control system may be configured to use the speed control look-up tables described in connection with FIG. 5*a*-5*o*. In doing so, the control system may use the speed control error (i.e. the increased speed demand), the current engine speed, the acceleration and the engine load to determine an appropriate transmission ratio gradient.

Once the increased transmission ratio gradient has been selected using the look-up tables, the engine speed necessary to provide the target speed set-point using the transmission ration gradient may be determined, as the transmission ratio, engine speed and vehicle speed are all inextricably linked.

In doing so, the engine is configured to control the transmission ratio and engine speed to try to increase the speed of the vehicle by a small but significant amount to load the brakes. It will be appreciated that in practice, due to the application of the brake command, the vehicle will decelerate despite the increased load.

It will be appreciated that although the look-up tables are described herein as being provided for the purpose of speed control and, optionally, an enhanced braking mode, this is not a limitation, and the look-up tables may be provided solely for the enhanced braking mode.

Figure 10:
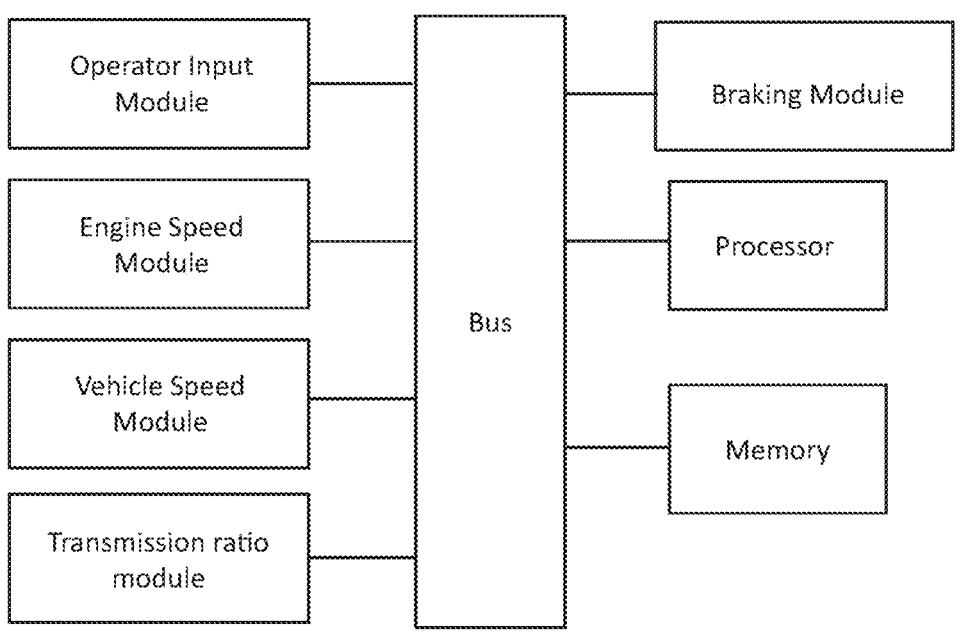
FIG. 10 shows a schematic representation of a control system for carrying out the methods disclosed herein; and, FIG. 11 shows a schematic representation of a vehicle control system according to the present disclosure.
Figure 11:
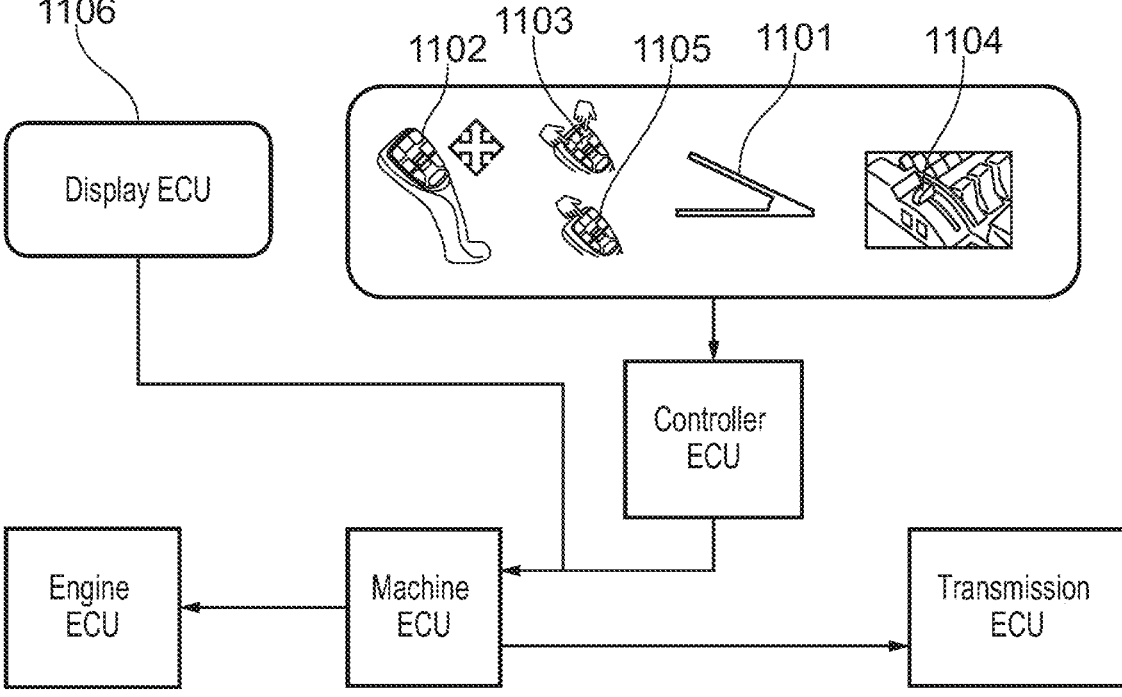

The vehicle of the present disclosure may comprise a conventional control system which is configured to carry out the methods as disclosed herein. With reference to FIGS. 10 and 11, the control system may comprise one or more controllers which are configured to receive data from the various vehicle systems which obtain the required operating parameters and to execute the methods described herein. Although the control system disclosed in FIGS. 10 and 11 may be used both for the speed control and braking control methods, it will be appreciated that there is no requirement for the control system or an associated vehicle to be configured to carry out both methods.

FIG. 10 shows a schematic representation of a general control system which may be configured to carry out the methods as disclosed herein. The control system comprises: a processor, a memory, a bus, and a plurality of data acquisition modules comprising one or more sensors.

FIG. 11 shows a schematic representation of a vehicle control system which comprises a plurality of electronic control units, ECUs, as known in the art. As shown, there may be separate ECUs for controlling the engine, input devices (i.e. the controller ECU") and transmission, with a central vehicle or "machine" ECU which generally coordinates the control of the vehicle and data exchange between the different systems. In the present example, the machine ECU may receive vehicle data required to carry out the methods described herein, such as the operator input device which may comprise an accelerator, throttle, brake, touch screen or joystick etc. from the controller ECU, the engine data such as engine speed from the engine ECU, and transmission data, such as the vehicle speed, from the transmission ECU, etc. It will be appreciated that other configurations are possible.

The braking demand may be determined by using an appropriate sensor on the braking input device. For example, where the braking device is a foot pedal 1101 there may be a position sensor or pressure transducer to determine the position or braking pressure of the input device relative to some datum. In some embodiments, the foot pedals may comprise an accelerator or throttle foot pedal. In other embodiments, the cab may comprise a joystick 1102, a plurality of buttons 1103 (mounted on the joystick or otherwise) a lever 1104, roller 1105 (mounted on the joystick or otherwise) or other movable device, or a display screen 1106 comprising a display ECU which may be used individually or in combination to carry-out the speed control method or braking control methods described herein.

At least one of the ECUs may be configured to determine and output the chosen transmission ratio as described herein. At least one ECU may be configured to control the engine speed.

Returning to FIG. 10, the processor may include at least one microprocessor and may comprise a single core processor or multiple processor cores (such as a quad core processor), or may comprise a plurality of processors (at least one of which may comprise multiple processor cores).

The memory may be any suitable non-transitory computer readable storage medium, data storage device or devices, and may comprise a hard disk drive (HDD) and/or a solid-state drive (SSD). The memory may be permanent nonremovable memory, or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The memory stores one or more computer programs comprising computer readable instructions that, when executed by the processor, causes performance of the methods described herein. The computer program may be software or firmware, or may be a combination of software and firmware. The memory may store the look-up tables as described herein and any further data required to execute the methods described herein.

The computer program may be stored on a non-transitory computer readable storage medium. The computer program may be transferred from the non-transitory computer readable storage medium to the memory. The non-transitory computer readable storage medium may be, for example, a Universal Serial Bus (USB) flash drive, a secure digital (SD) card, or an optical disc (such as a compact disc (CD), a digital versatile disc (DVD) or a Blu-ray disc). In some examples, the computer program may be transferred to the memory via a signal, such as a wireless signal or a wired signal.

The control system as shown in FIG. 10 comprises a plurality of modules which are configured to obtain or receive the vehicle operating data and/or execute any method described herein. The modules may comprise one or more sensors configured to obtain vehicle operating data. The modules may be configured to sense, measure or otherwise obtain or determine the data required for the performance of the methods described herein. In FIG. 10 the modules comprise: one or more operator input modules for obtaining operator inputs or commands such as a braking command or a speed set command or data associated therewith, an engine speed module for determining and controlling the speed of the engine, a vehicle speed module for determining the vehicle speed and acceleration, a transmission ratio module for determining and controlling the transmission ratio and a braking module for controlling the hydraulic braking of the tractor unit and the trailer. Each of the modules may form part of or provide data to one or more controllers the electronic control units shown in FIG. 11 and are generally known in the art so not described further.

The bus connects the various components in the control system and may comprise any suitable data bus configured to send and receive data or instructions therebetween. The bus may comprise a controller area network, CAN, bus as well known in the art.

The ECUs shown in FIG. 11 may comprise any suitable circuitry to cause performance of the methods described herein in relation to the operation of the first device. Each of the ECUs may comprise: the processor and memory as described above; control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the described methods.

The one or more embodiments are described above by way of example only and it will be appreciated that the variations are possible without departing from the scope of protection afforded by the appended claims.

The invention claimed is:

1. A method for controlling the braking effort of a tractor unit relative to the braking effort of a trailer being towed by the tractor unit, the method comprising:

activating an enhanced braking mode in the tractor unit;

receiving, from an operator input device whilst in the enhanced braking mode, a common braking command for both the tractor unit and the trailer;

increasing a tractor unit speed demand on the tractor unit whilst receiving the common braking command for both the tractor unit and the trailer; and applying the brakes to the trailer and the tractor unit according to the common braking command, wherein the braking effort applied to the tractor unit is less than the braking effort applied to the trailer due to the increased speed demand.

2. The method of claim 1, wherein the increased speed demand is determined in relation to the magnitude of the common braking command.

3. The method of claim 2, wherein the magnitude of the common braking command is dependent on the braking pressure provided by the operator input device.

4. The method of claim 1, wherein the increased speed demand comprises setting a vehicle speed set-point which is greater than a current vehicle speed.

5. The method of claim 4, wherein the vehicle speed set-point is increased above the current vehicle speed in accordance with the common braking command.

6. The method of any of claim 5, wherein the increase in vehicle speed set-point is proportional to the common braking command.

7. The method of claim 6, wherein the increase in speed demand is less than 1.5 kph above the current vehicle speed.

8. The method of claim 1, wherein the magnitude of the increase in speed demand is independent of the current vehicle speed.

9. The method of claim 1, further comprising determining a transmission ratio and applying the transmission ratio to a transmission of the tractor unit to provide the increase in vehicle speed demand.

10. The method of claim 9, wherein the transmission ratio is determined using the acceleration of the vehicle and the engine load as a percentage of a full load.

11. The method of claim 9, further comprising selecting the transmission ratio using a plurality of look-up tables.

12. The method of claim 9, wherein the transmission ratio is selected using the engine speed, acceleration, engine load as a percentage of the full load and the vehicle speed demand.

13. The method of claim 9, wherein look-up tables are used in a speed control mode in which the tractor unit is configured to maintain a set speed without manual intervention from the operator.

14. The method of claim 1, wherein the enhanced braking mode is activated by an operator command.

15. A tractor unit configured to tow a trailer, the tractor unit comprising:

a prime mover;

a transmission in which the transmission ratio is controllable via a controller; and, the controller configured to:

receive an enhanced braking mode activation signal from an operator of the tractor unit;

receive, from an operator input device whilst in the enhanced braking mode, a common braking command for both the tractor unit and the trailer;

increase a tractor unit speed demand on the tractor unit whilst receiving the common braking command for both the tractor unit and the trailer; and apply the brakes to the trailer and the tractor unit according to the common braking command, wherein the braking effort applied to the tractor unit is less than the braking effort applied to the trailer due to the increased speed demand.

16. A method for controlling the braking effort of a tractor unit relative to the braking effort of a trailer being towed by the tractor unit, the method comprising:

activating an enhanced braking mode in the tractor unit;

receiving, from an operator input device whilst in the enhanced braking mode, a common braking command for both the tractor unit and the trailer;

increasing a tractor unit speed demand on the tractor unit whilst receiving the common braking command for both the tractor unit and the trailer;

applying the common braking command to a brake of the tractor unit and a brake of the trailer, wherein the braking effort applied to the tractor unit is less than the braking effort applied to the trailer due to the increased speed demand.

* * * * *